United States Patent
Chiba et al.

(10) Patent No.: US 6,788,802 B2
(45) Date of Patent: *Sep. 7, 2004

(54) OPTICAL FLOW ESTIMATION METHOD AND IMAGE SYNTHESIS METHOD

(75) Inventors: Naoki Chiba, Higashiosaka (JP); Takeo Kanade, Pittsburgh, PA (US); Hiroshi Kano, Kyotanabe (JP)

(73) Assignees: Sanyo Electric Co., Ltd., Osaka (JP); QuantaPoint, Inc., Duquesne, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/081,862

(22) Filed: May 21, 1998

(65) Prior Publication Data

US 2003/0058945 A1 Mar. 27, 2003

(51) Int. Cl.⁷ .................................................. G06K 9/00
(52) U.S. Cl. ........................................ 382/107; 382/284
(58) Field of Search ............................. 382/107, 284, 382/287; 342/115, 435

(56) References Cited

U.S. PATENT DOCUMENTS

| | | | | | |
|---|---|---|---|---|---|
| 5,936,671 A | * | 8/1999 | Van Beek et al. | .......... | 348/413 |
| 5,987,164 A | * | 11/1999 | Szeliski et al. | ............. | 382/154 |
| 5,991,444 A | * | 11/1999 | Burt et al. | ................... | 382/232 |
| 6,002,794 A | * | 12/1999 | Bonneau et al. | ............ | 382/166 |
| 6,008,865 A | * | 12/1999 | Fogel | .......................... | 348/700 |
| 6,011,558 A | * | 1/2000 | Hsich et al. | ................. | 345/435 |
| 6,018,349 A | * | 1/2000 | Szeliski et al. | ............. | 345/425 |
| 6,097,854 A | * | 8/2000 | Szeliski et al. | ............. | 382/284 |
| 6,157,747 A | * | 12/2000 | Szeliski et al. | ............. | 382/284 |

FOREIGN PATENT DOCUMENTS

| JP | 04-040576 | 2/1992 |
|---|---|---|
| JP | 09-073540 | 3/1997 |

OTHER PUBLICATIONS

: Rousso, B. Et al., Universal mosaicing using pipe projection, Sixth International Conference on Computer Vision, Jan. 1998.*

Japanese Notice of Rejection for application No. JP 11–02726 and English translation dated Aug. 20, 2002.

* cited by examiner

*Primary Examiner*—Amelia M. Au
*Assistant Examiner*—Martin Miller
(74) *Attorney, Agent, or Firm*—Arent Fox, PLLC.

(57) ABSTRACT

Optical flow is calculated for each sub-block on the basis of two images, the sub-blocks are then partitioned into a region having low confidence and a region having high confidence depending on the reliability of the optical flow, and the optical flow in the region having low confidence is filled by dilation processing using the optical flow in its surrounding regions.

12 Claims, 8 Drawing Sheets thresholded flow field     structure element     filled result

OPTICAL FLOW ESTIMATION METHOD AND IMAGE SYNTHESIS METHOD

BACKGROUND OF THE INVENTION

1. Field of the Invention

The present invention relates to an optical flow estimation method, an image synthesis method, an image synthesizer, a recording medium on which an image synthesis program is recorded, a digital camera, and a printer.

2. Description of the Prior Art

A technique for calculating optical flow from two images, and registering the two images on the basis of the obtained optical flow has been known. Description is now made of a conventional method of calculating optical flow.

(1) Lucas-Kanade Method

A large number of methods of calculating apparent optical flow of a moving object in a moving image have been conventionally proposed. The Lucas-Kanade method which is a local gradient method out of the methods is one of the best methods. The reason for this is that the speed of processing is high, implementing is easy, and the result has confidence.

As for the details of the Lucas-Kanade method, see an article: B. Lucas and T. Kanade, "An Iterative Image Registration Technique with an Application to Stereo Vision", In Seventh International Joint Conference on Artificial Intelligence (IJCAI-81), pp. 674–979, 1981.

The outline of the Lucas-Kanade method will be described.

When a gray scale pattern I(x, y, t) of image coordinates p=(x, y) at time t is moved to coordinates (x+δx, y+δy) with its gradation distribution kept constant after a very short time period (δt), the following optical flow constraint equation (1) holds:

$$\frac{\partial I}{\partial x}\frac{\delta x}{\delta t} + \frac{\partial I}{\partial y}\frac{\delta y}{\delta t} + \frac{\partial I}{\partial t}\delta t = 0 \quad (1)$$

In order to calculate optical flow {v=(δx/δt, δy/δt)=(u, v)} in a two-dimensional image, the number of unknown parameters is two, so that another constraint equation is required. Lucas and Kanade have assumed that optical flow is constant in a local region of an identical object.

Suppose optical flow is constant within a local region ω on an image, for example. In this case, a square error E of a gray scale pattern to be minimized can be defined by the following equation (2) when the following substitutions are made:

$I_0(P)=I(x,y,t)$, $I_1(p+v)=I(x+u,y+v,t+\delta t)$ $$E = \sum_\omega [I_1(p + v) - I_0(p)]^2 \quad (2)$$

When v is very small, the terms of second and higher degrees in Taylor's expansion can be ignored, so that the relationship expressed by the following equation (3) holds:

$$I_1(p+v)=I_1(p)+g(p)v \quad (3)$$

where g(p) is a linear differential of $I_1(p)$.

The error E is minimized when the derivative of E with respect to v is zero, so that the relationship expressed by the following equation (4) holds:

$$0 = \frac{\partial}{\partial v}E \quad (4)$$

$$\approx \frac{\partial}{\partial v}\sum_\omega [I_1(p) + g(p)v - I_0(p)]^2$$

$$= \sum_\omega 2g(p)[I_1(p) + g(p)v - I_0(p)]$$

Therefore, the optical flow v is found by the following equation (5):

$$v \approx \frac{\sum_\omega g(p)[I_0(p) - I_1(p)]}{\sum_\omega g(p)^2} \quad (5)$$

Furthermore, the optical flow can be found with high precision by Newton-Raphson iteration, as expressed by the following equation (6):

$$v_{k+1} = v_k + \frac{\sum g_k[I_0 - I_1^k]}{\sum (g_k)^2} \quad (6)$$

where $I_1^k=I_1(P+v_k)$, $g_k=g(p+v_k)$, $I_0=I_0(p)$.

(2) Hierarchical Estimation Method

The largest problem of the gradient methods, including the Lucas-Kanade method, is that they cannot be applied to large motion because a good initial value is required. Therefore, a method of producing images respectively having resolutions which are different at several levels like a pyramid hierarchical structure to solve the problem has been conventionally proposed.

Images having resolutions which are different at several levels are first previously produced from each of two consecutive images. Approximate optical flow is then calculated between the images having the lowest resolution. More precise optical flow is calculated between the images having a resolution which is higher by one level. The processing is successively repeated until optical flow is calculated between the images having the highest resolution.

FIG. 1d, FIG. 1c, FIG. 1b, and FIG. 1a respectively illustrate optical flow found from an original image, optical flow found from an image having lower resolution than that of the original image shown in FIG. 1d, optical flow found from an image having lower resolution than that of the image having low resolution shown in FIG. 1c, and optical flow found from an image having lower resolution than that of the image having low resolution shown in FIG. 1b. In FIGS. 1a to 1d, S indicates one patch.

The optical flow is gradually found from the image shown in FIG. 1a (an image in a hierarchy 1) the image shown in FIG. 1b (an image in a hierarchy 2), the image shown in FIG. 1c (an image in a hierarchy 3) and the image shown in FIG. 1d (an image in a hierarchy 4) in this order. In FIGS. 1a to 1d, an arrow indicates an optical flow vector found for each patch.

However, the problem is that in a real image, there are few regions containing sufficient texture, so that reliable optical flow is not obtained.

A technique for affixing a plurality of images to one another and synthesizing the images to obtain a seamless image having a wide field of view and having high resolution (image mosaicking) has been conventionally actively studied. Classical applications include synthesis of aerial photographs or satellite photographs. In recent years, a method of synthesizing a plurality of digital images to obtain a seamless panoramic image, constructing a virtual reality environment has been paid attention to.

The following two methods have been known as a technique for obtaining a panoramic image by synthesis.

The first method is a method of translating a camera to previously pick up a plurality of images. The plurality of images obtained are simultaneously displayed on a monitor by a personal computer. A user designates corresponding points between the two images, to synthesize the two images.

In the first method, the motion of the camera is restricted to translation. In the first method, the user must designate the corresponding points.

The second method is a method of fixing a camera to a tripod and restricting the motion of the camera to only rotation on a horizontal surface, to pick up a plurality of images. The plurality of images obtained are projected on a cylindrical surface, to synthesize the images (see U.S. Pat. No. 5,396,583).

In the second method, the motion of the camera must be restricted to only rotation on a horizontal surface. Further, the focal length of the camera must be measured.

SUMMARY OF THE INVENTION

An object of the present invention is to provide an optical flow estimation method in which reliable optical flow is obtained even when an image region is hardly textured.

Another object of the present invention is to provide an image synthesis method, an image synthesizer, and a recording medium on which an image synthesis program is recorded, in which a seamless panoramic image can be obtained from a plurality of images, a camera is allowed to freely moving in order to pick up the plurality of images, and the focal length need not be measured.

Still another object of the present invention is to provide a digital camera or a printer having an image synthesis function capable of obtaining a seamless panoramic image from a plurality of images, allowing a camera to freely moving in order to pick up the plurality of images, and eliminating the necessity of measuring the focal length.

An optical flow estimation method according to the present invention is characterized by calculating optical flow for each sub-block on the basis of two images, partition the sub-blocks into a region having low confidence and a region having high confidence depending on the reliability of the optical flow, and filling the optical flow in the region having low confidence by dilation processing using the optical flow in its surrounding regions.

Confidence $\gamma$ is found, upon calculating from a 2×2 matrix of coefficients G in the following equation (7) having as elements the squares of differentials in the vertical and horizontal directions of an image region $\omega$ its eigenvalues, by the following equation (8) from the smaller eigenvalue $\lambda_{min}$ and a gray scale residual E between the regions after tracking:

$$G = \sum_{p \in \omega} g(p)g(p)^T \quad (7)$$

$$\gamma = \frac{\lambda_{min}}{E} \quad (8)$$

An image synthesis method according to the present invention is an image synthesis method for synthesizing a first image and a second image without a seam, characterized by comprising the first step of extracting an overlapped portion of the first image and the second image, the second step of extracting from the overlapped portion of the first image a plurality of partial images which are effective for tracking by optical flow as feature points, the third step of tracking a position, on the second image, of each of the feature points on the first image on the basis of the optical flow, the fourth step of finding a planar projective transform matrix for finding, on the basis of each of the feature points on the first image and the corresponding position on the second image which is found in the third step, a point, corresponding to the point on the first image, on the second image, and the fifth step of synthesizing the first image and the second image such that the corresponding points on the first image and the second image coincide with each other on the basis of the obtained planar projective transform matrix.

In the first step, the overlapped portion of the first image and the second image is extracted on the basis of the SSD method.

The third step comprises the steps of finding the optical flow from the first image and the second image on the basis of an optical flow estimation method using the hierarchically structured Lucas-Kanade method for filling the optical flow having low confidence out of the optical flows obtained in the respective stages of the optical flow estimation method by dilation processing using the optical flow in its surrounding regions, and tracking the position, on the second image, of each of the feature points on the first image on the basis of the obtained optical flow.

An image synthesizer according to the present invention is an image synthesizer for synthesizing a first image and a second image without a seam, characterized by comprising first means for extracting an overlapped portion of the first image and the second image, second means for extracting from the overlapped portion of the first image a plurality of partial images which are effective for tracking by optical flow as feature points, third means for tracking a position, on the second image, of each of the feature points on the first image on the basis of the optical flow, fourth means for finding a planar projective transform matrix for finding, on the basis of each of the feature points on the first image and the corresponding position on the second image which is found in the third step, a point, corresponding to the point on the first image, on the second image, and fifth means of synthesizing the first image and the second image such that the corresponding points on the first image and the second image coincide with each other on the basis of the obtained planar projective transform matrix.

An example of the first means is one extracting the overlapped portion of the first image and the second image on the basis of the SSD method.

An example of the third means is one comprising means for finding the optical flow from the first image and the second image on the basis of an optical flow estimation method using the hierarchically structured Lucas-Kanade method for filling the optical flow having low confidence out of the optical flows obtained in the respective stages of the optical flow estimation method by dilation processing using the optical flow in its surrounding regions, and means for tracking the position, on the second image, of each of the feature points on the first image on the basis of the obtained optical flow.

A computer readable recording medium on which an image synthesis program is recorded in the present invention is a computer readable recording medium on which an image synthesis program for synthesizing a first image and a second image without a seam is recorded, characterized in which the image synthesis program comprises the first step of extracting an overlapped portion of the first image and the second image, the second step of extracting from the overlapped portion of the first image a plurality of partial images which are effective for tracking by optical flow as feature points, the third step of tracking a position, on the second image, of each of the feature points on the first image on the basis of the optical flow, the fourth step of finding a planar projective transform matrix for finding, on the basis of each of the feature points on the first image and the corresponding position on the second image which is found in the third step, a point, corresponding to the point on the first image, on the second image, and the fifth step of synthesizing the first image and the second image such that the corresponding points on the first image and the second image coincide with each other on the basis of the obtained planar projective transform matrix.

In the first step, the overlapped portion of the first image and the second image is extracted on the basis of the SSD method.

The third step comprises the steps of finding the optical flow from the first image and the second image on the basis of an optical flow estimation method using the hierarchically structured Lucas-Kanade method for filling the optical flow having low confidence out of the optical flows obtained in the respective stages of the optical flow estimation method by dilation processing using the optical flow in its surrounding regions, and tracking the position, on the second image, of each of the feature points on the first image on the basis of the obtained optical flow.

A digital camera according to the present invention is a digital camera in which an image synthesis program for synthesizing a first image and a second image without a seam is incorporated, characterized in that the image synthesis program comprises the first step of extracting an overlapped portion of the first image and the second image, the second step of extracting from the overlapped portion of the first image a plurality of partial images which are effective for tracking by optical flow as feature points, the third step of tracking the position, on the second image, of each of the feature points on the first image on the basis of the optical flow, the fourth step of finding a planar projective transform matrix for finding, on the basis of each of the feature points on the first image and the corresponding position on the second image which is found in the third step, a point, corresponding to the point on the first image, on the second image, and the fifth step of synthesizing the first image and the second image such that corresponding points on the first image and the second image coincide with each other on the basis of the obtained planar projective transform matrix.

A printer according to the present invention is a printer in which an image synthesis program for synthesizing a first image and a second image without a seam is incorporated, characterized in that the image synthesis program comprises the first step of extracting an overlapped portion of the first image and the second image, the second step of extracting from the overlapped portion of the first image a plurality of partial images which are effective for tracking by optical flow as feature points, the third step of tracking a position, on the second image, of each of the feature points on the first image on the basis of the optical flow, the fourth step of finding a planar projective transform matrix for finding, on the basis of each of the feature points on the first image and a corresponding position on the second image which is found in the third step, a point, corresponding to the point on the first image, on the second image, and the fifth step of synthesizing the first image and the second image such that the corresponding points on the first image and the second image coincide with each other on the basis of the obtained planar projective transform matrix.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3$b$ is a schematic view showing optical flow after filling;

DETAILED DESCRIPTION OF THE PREFERRED EMBODIMENTS

[1] Description of an Optical Flow Estimation Method According to the Present Invention An optical flow estimation method according to the present invention presupposes hierarchical prediction for producing images having resolutions which are different at several levels like a pyramid hierarchical structure to gradually calculate optical flow. A method of calculating the optical flow conforms to a gradient method such as the Lucas-Kanade method. That is, it presupposes an optical flow estimation method using a hierarchically structured gradient method. The Lucas-Kanade method is used as a gradient method.

The optical flow estimation method according to the present invention is characterized in that optical flow obtained in respective stages of an optical flow estimation method using the hierarchically structured Lucas-Kanade method is filled by dilation processing. This will be described in detail below.

One of advantages of the Lucas-Kanade method is that the result of tracking have confidence. Tomasi and Kanade have showed that the trackability of a region can be calculated from image derivatives as follows (C. Tomasi and Kanade, "Shape and Motion from Image Streams: a Factorization method-Part 3 Detection and Tracking of Point Features, "CMU-CS-91-132, Carnegie Mellon University, 1991).

From a 2×2 matrix of coefficients G in the following equation (9) having as elements the squares of differentials in the vertical and horizontal directions of an image region $\omega$, its eigenvalues are calculated, so that the trackability of the region can be determined:

$$G = \sum_{p \in \omega} g(p)g(p)^T \qquad (9)$$

When both the eigenvalues of the matrix G are large, the region changes in orthogonal directions, and can be uniquely positioned. Consequently, the confidence γ of the result of tracking can be obtained by the following equation (10) from the smaller eigenvalue $\lambda_{min}$ and a gray scale residual E between the regions after the tracking:

$$\gamma = \frac{\lambda_{min}}{E} \qquad (10)$$

The inventors of the present invention have developed a method of interpolating a region having low confidence using the result having high confidence in the same hierarchy in optical flow. This uses the result in a hierarchy at the next coarser resolution level for only an initial value for tracking and does not utilize the result in a hierarchy at the current resolution level which is paid attention to. Alternatively, it is assumed that optical flow in a region which is hardly textured has a value close to optical flow in its surrounding regions, to fill a flow field by morphology processing.

Figure 1B:
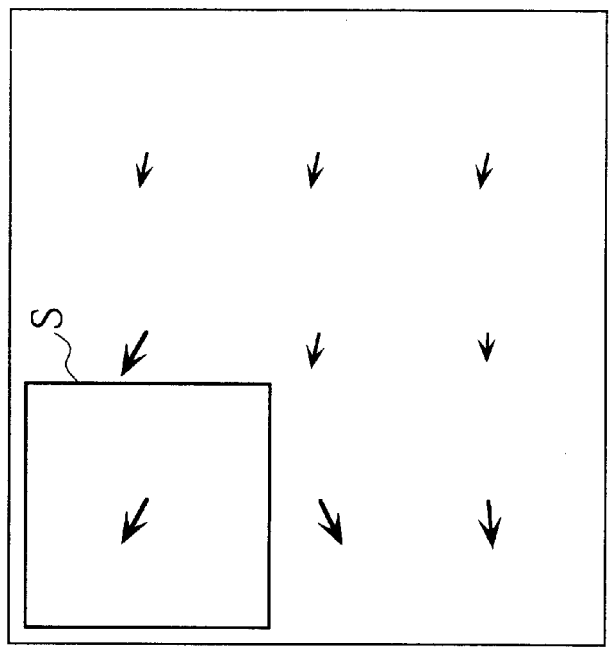
FIGS. 1$a$ to 1$d$ are schematic views for explaining a hierarchical estimation method.
Figure 1A:
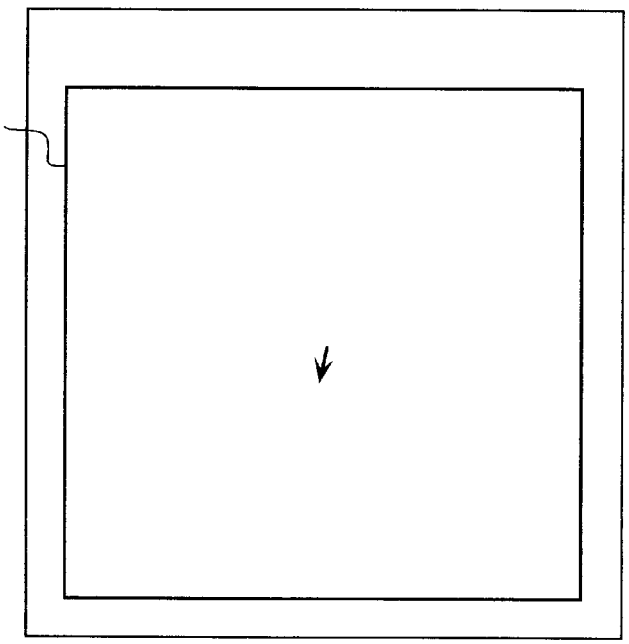
Figure 1D:
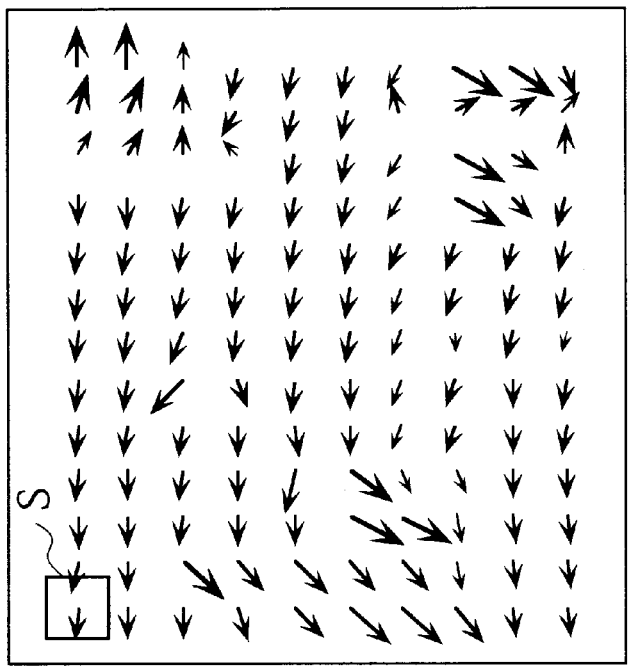
Figure 1C:
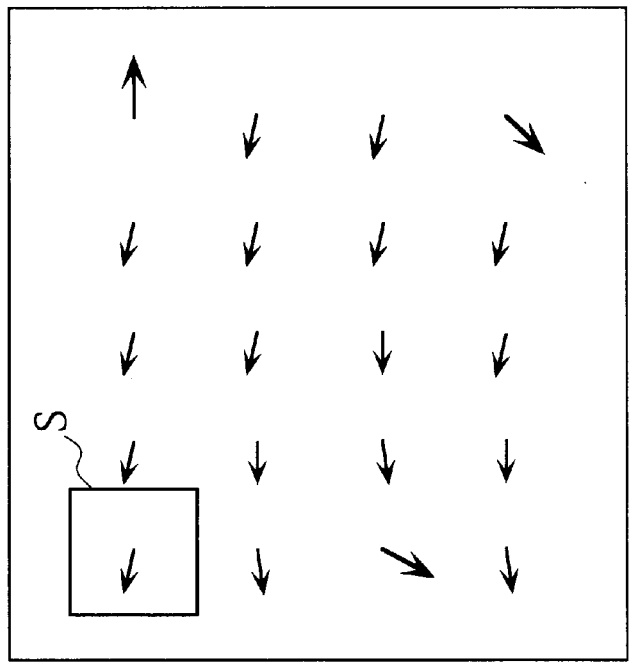
Figure 2:
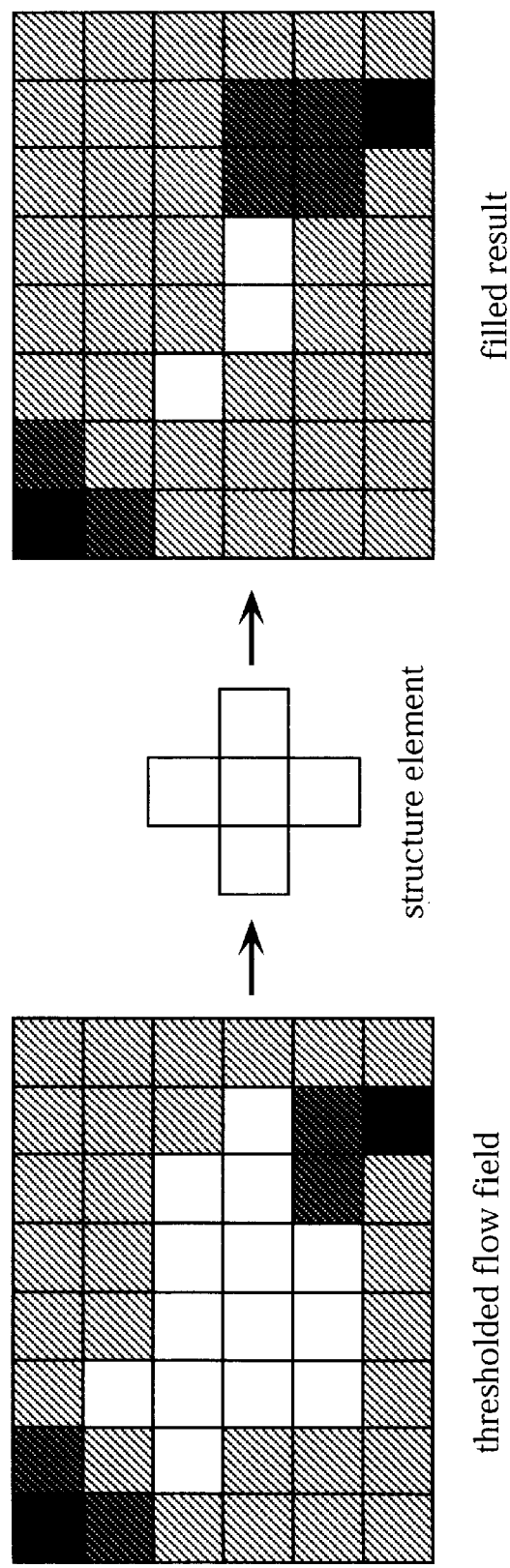
FIG. 2 is a schematic view for explaining dilation processing performed in an optical flow estimation method according to the present invention.

FIG. 2 shows how flow vector dilation processing is performed.

The left drawing represents a map of the confidence of a flow vector on the gray scale. It is assumed that the blacker the map is, the higher the confidence is.

Obtained flow is first subjected to threshold processing. A white portion is subjected to threshold processing because the result has low confidence.

The dilation processing of the result in the flow field is then performed as follows in imitation of hole filling processing using a morphology operation in a binary image. A flow vector u(i, j) in coordinates i,j of a region can be calculated, as expressed by the following equation (11), upon being weighted depending on confidence γ from flow vectors in its four vicinities:

$$u(i, j) = \sum_{p,q} \frac{\gamma(i+p, j+q) \times u(i+p, j+q)}{\gamma_A} \qquad (11)$$

$$(p, q) = (0, 1), (0, -1), (-1, 0), (1, 0)$$

$$\gamma_A = \sum_{p,q} \gamma(i+p, j+q)$$

The processing is repeated until all regions having low confidence which are subjected to threshold processing are filled. The filling processing is performed in each hierarchy. The flow vector u(i, j) in coordinates i,j of a region may be calculated upon being weighted depending on confidence γ from flow vectors in its eight vicinities.

Figure 3B:
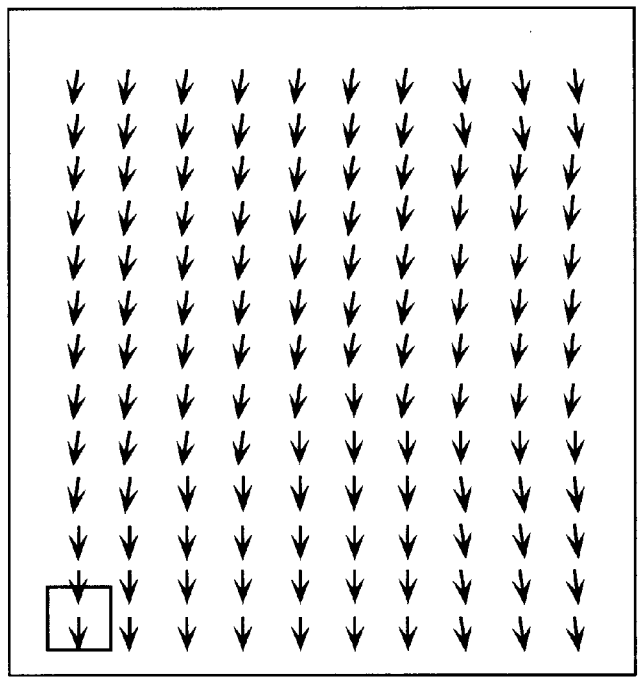
FIG. 3$a$ is a schematic view showing an example of optical flow which is subjected to threshold processing for an image in a hierarchy.
Figure 3A:
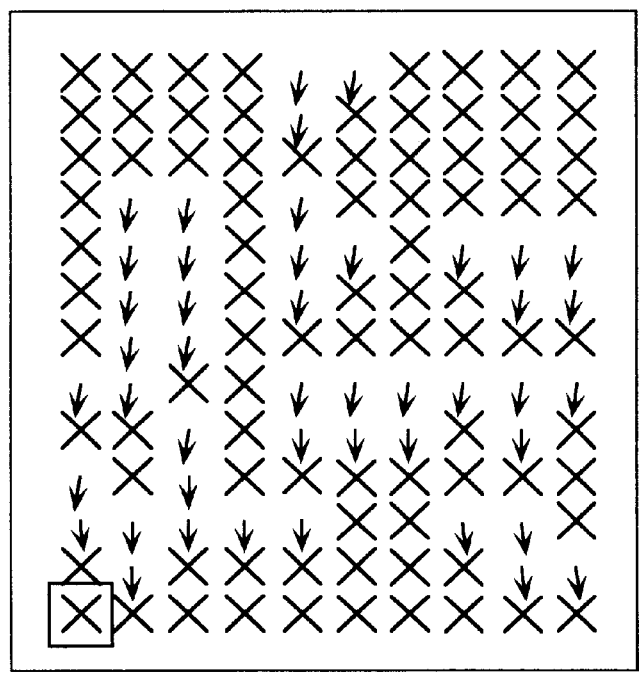

FIG. 3a shows optical flow which is subjected to threshold processing for an image in a hierarchy, and FIG. 3b shows optical flow after filling. In FIG. 3a, arrows are optical flow vectors whose confidence is judged to be high by the threshold processing, and X marks indicate portions whose confidence is judged to be low.

[2] Description of Panoramic Image Synthesizer

Description is now made of a panoramic image synthesizer for obtaining a seamless panoramic image from a plurality of images.

Figure 4:
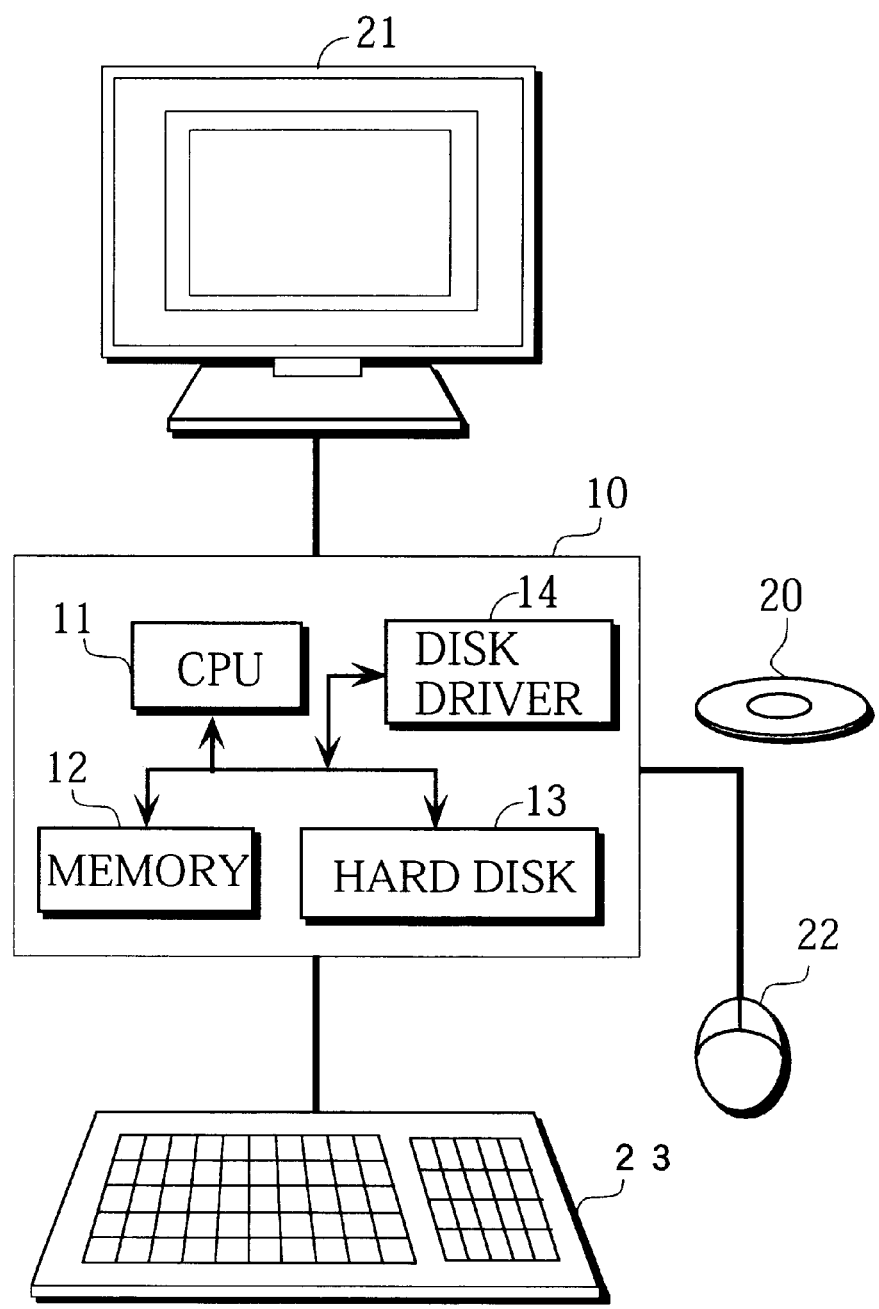
FIG. 4 is a block diagram showing the construction of a panoramic image synthesizer.

FIG. 4 illustrates the construction of a panoramic image synthesizer.

A display 21, a mouse 22 and a keyboard 23 are connected to a personal computer 10. The personal computer 10 comprises a CPU 11, a memory 12, a hard disk 13, and a driver 14 of a removable disk such as a CD-ROM.

The hard disk 13 stores software for panoramic image synthesis including a panoramic image synthesis program in addition to an OS (Operating System). The software for panoramic image synthesis is installed in the hard disk 13 using a CD-ROM 20 storing the software. It is assumed that a plurality of images picked up by a digital camera are previously stored in the hard disk 13.

Figure 5:
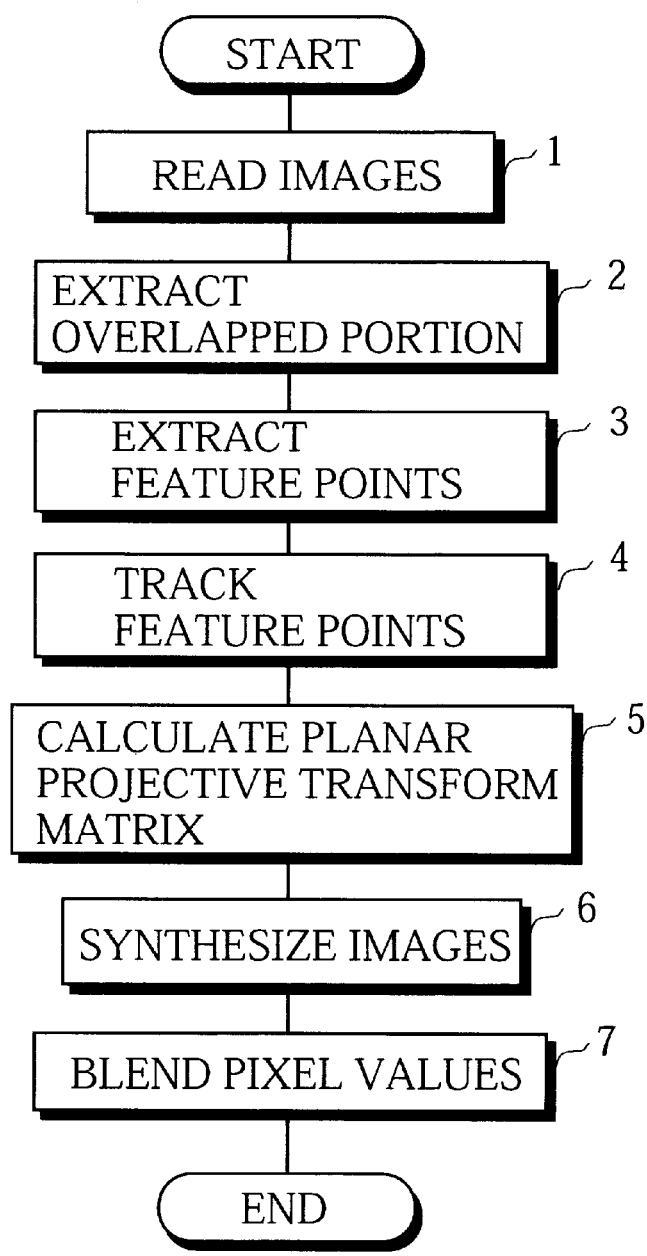
FIG. 5 is a flow chart showing the procedure for panoramic image synthesis processing.

FIG. 5 shows the procedure for panoramic image synthesis processing performed by the CPU 11 in a case where a panoramic image synthesis program is started.

For convenience of illustration, description is made of a case where two images are synthesized.

(I) Two images (a first image and a second image) which are designated by a user are read in the memory 12 (step 1).

(II) Processing for extracting an overlapped portion of the two images is then performed (step 2). The processing for extracting the overlapped portion is performed on the basis of the SSD (Sum of Squared Differences) method.

Specifically, with respect to the two images, images $I_1$ and $I_2$ having lower resolution than that of the original images are first respectively produced. An overlapped portion ω (size: M×N) of the two images $I_1$ and $I_2$ having low resolution is found using a square error (E) per pixel, as expressed by the following equation (12). The amount of movement (d) between the images is changed in an allowable range, and the overlapped portion is extracted from the amount of movement (d) in a case where E is the smallest.

$$E(d) = \frac{\sum_{\omega} (I_1(x) - I_2(x+d))^2}{M \times N} \qquad (12)$$

(III) Feature points are then extracted (step 3). That is, a plurality of partial images (rectangular regions) which are effective for tracking are extracted as feature points from the overlapped portion of the first image. In this case, the feature points are extracted such that they are not overlapped with each other. Specifically, the above-mentioned portion having high confidence γ is extracted as the feature point.

(IV) The feature points are then subjected to tracking processing (step 4). That is, a position, on the second image, of the extracted feature point on the first image is tracked.

Specifically, an optical flow vector for each patch of suitable size (13×13, for example) is first found by the optical flow estimation method described in the item [1]. The position, on the second image, corresponding to the feature point on the first image is found in units not exceeding units of pixels by linear interpolation from flow vectors in the patch in four vicinities of the feature point on the first image.

(V) A planar projective transform matrix is then calculated (step 5).

Figure 6:
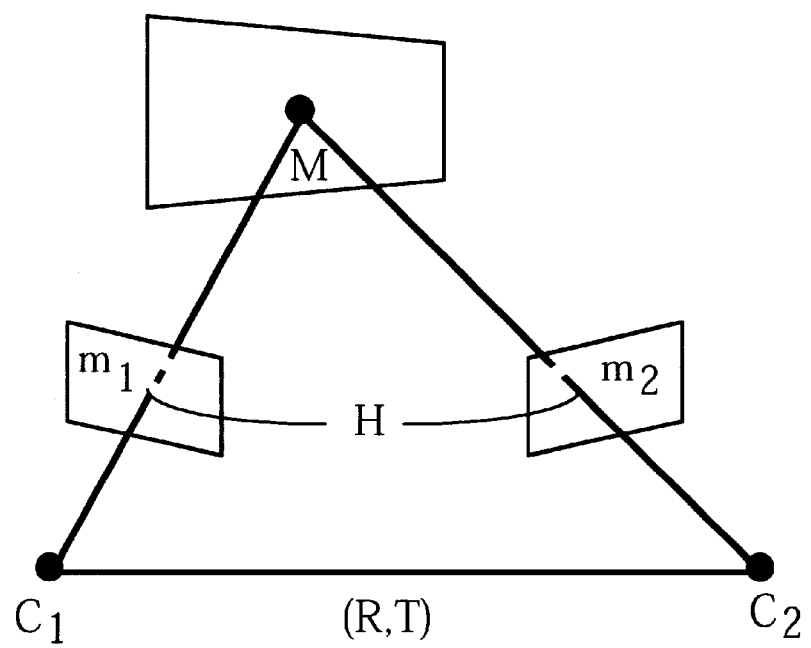
FIG. 6 is an illustration for explaining a plane projective matrix.

When a scene to be an object is far, or is a wall of a building or a black board, or the like even if it is near, it can be assumed that it exists on a single plane. It is known in projective geometry that when a point M on a single plane in a three-dimensional space is observed from two different points of view $C_1$ and $C_2$, as shown in FIG. 6, transform between coordinates $m_1$ and $m_2$ on their respective image surfaces is linear, which is referred to as homography (O. Faugeras, "Three-Dimension Computer Vision a Geometric Viewpoint", MIT press, 1993.)

That is, in a case where the coordinates of an image are represented by homogeneous coordinates, a point $m_1=(x_1, y_1, 1)^t$ on the first image has a corresponding point $m_2=(x_2, y_2, 1)^t$ on the second image, and the relationship therebetween is defined by the following equation (13):

$$m_2 \sim Hm_1 = \begin{pmatrix} h_0 & h_1 & h_2 \\ h_3 & h_4 & h_5 \\ h_6 & h_7 & 1 \end{pmatrix} \begin{pmatrix} x_1 \\ y_1 \\ 1 \end{pmatrix} \quad (13)$$

~ indicates projective equivalence, leaving a scale factor. The transform matrix can be rewritten, as expressed by the following equations (14):

$$x_2 = \frac{h_0 x_1 + h_1 y_1 + h_2}{h_6 x_1 + h_7 y_1 + 1} \quad (14)$$

$$y_2 = \frac{h_3 x_1 + h_4 y_1 + h_5}{h_6 x_1 + h_7 y_1 + 1}$$

(VI) An image is produced by overlapping both the images with each other such that the positions of the two images coincide with each other on the basis of the found planar projective transform matrix (step 6).

(VII) Pixel values are blended with respect to an overlapped portion of the two images (step 7). That is, the first image and the second image are not the same in pick-up conditions, so that one of the images may, in some cases, be darker than the other image. Therefore, a pixel value corresponding to a target point in the overlapped portion of the two images is a value obtained by blending a pixel value, corresponding to the target point, of the first image and a pixel value, corresponding to the target point, of the second image, on the basis of the distances from both ends of the overlapped portion of the two images to the target point.

[3] Description of Other Applications

Software for panoramic image synthesis which is used in the above-mentioned image synthesizer can be commercialized as a simplex. The panoramic image synthesis program can be incorporated into a printer for a digital still camera image printing laboratory, a printer for outputting a digital camera image, a digital camera, a copying machine, or the like.

Figure 7:
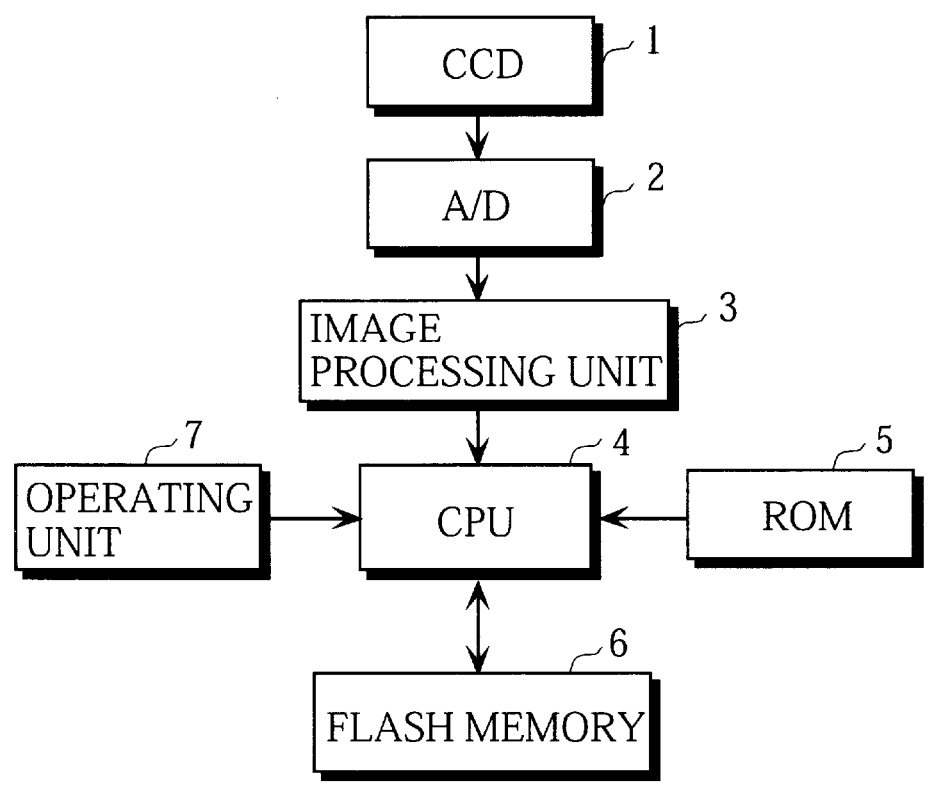
FIG. 7 is a block diagram showing the construction of a digital still camera in which a panoramic image synthesis program is incorporated.

FIG. 7 illustrates the construction of a digital still camera in which the panoramic image synthesis program is incorporated.

The digital still camera comprises a CCD 1, an analog-to-digital (A/D) converter 2, an image processing unit 3, a CPU 4, a ROM 5, a flash memory 6, an operating unit 7, and the like, similarly to the normal digital still camera. The panoramic image synthesis program is stored in the ROM 5.

The panoramic image synthesis program is started by operating the operating unit 7, so that a plurality of images which have been already accepted in the flash memory 6 are synthesized by the method described in the item [2], to produce one panoramic image. The produced panoramic image is stored in the flash memory 6.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical flow estimation method so adapted as to calculate optical flow for each sub-block on the basis of two images, partition the sub-blocks into a region having low confidence and a region having high confidence depending on the reliability of the optical flow, and fill the optical flow in the region having low confidence by dilation processing using the optical flow in its surrounding regions wherein confidence $\gamma$ is found, upon calculating from a 2×2 matrix of coefficients G in the following equation (a) having as elements the squares of differentials in the vertical and horizontal directions of an image region $\omega$ and its eigenvalues, by the following equation (b) from the smaller eigenvalue $\lambda_{min}$ and a gray scale residual E between the regions after tracking:

$$G = \sum_{p \in \omega} g(p)g(p)^T \quad (a)$$

$$\gamma = \frac{\lambda_{min}}{E} \quad (b)$$

2. An image synthesis method for synthesizing a first image and a second image without a seam, comprising:

the first step of extracting an overlapped portion of the first image and the second image;

the second step of extracting from the overlapped portion of the first image a plurality of partial images which are effective for tracking by optical flow as feature points;

the third step of tracking a position, on the second image, of each of the feature points on the first image on the basis of the optical flow;

the fourth step of finding a planar projective transform matrix for finding, on the basis of each of the feature points on the first image and the corresponding position on the second image which is found in the third step, a point, corresponding to the point on the first image, on the second image; and the fifth step of synthesizing the first image and the second image such that the corresponding points on the first image and the second image coincide with each other on the basis of the obtained planar projective transform matrix.

3. The image synthesis method according to claim 2, wherein in the first step, the overlapped portion of the first image and the second image is extracted on the basis of the Sum of Squared Differences method.

4. The image synthesis method according to claim 2, wherein the third step comprises the steps of finding the optical flow from the first image and the second image on the basis of an optical flow estimation method using the hierarchically structured Lucas-Kanade method for filling the optical flow having low confidence out of the optical flows obtained in the respective stages of the optical flow estimation method by dilation processing using the optical flow in its surrounding regions, and tracking the position, on the second image, of each of the feature points on the first image on the basis of the obtained optical flow.

5. An image synthesizer for synthesizing a first image and a second image without a seam, comprising:

first means for extracting an overlapped portion of the first image and the second image;

second means for extracting from the overlapped portion of the first image a plurality of partial images which are effective for tracking by optical flow as feature points;

third means for tracking a position, on the second image, of each of the feature points on the first image on the basis of the optical flow;

fourth means for finding a planar projective transform matrix for finding, on the basis of each of the feature points on the first image and the corresponding position on the second image which is found in the third step, a point, corresponding to the point on the first image, on the second image; and fifth means of synthesizing the first image and the second image such that the corresponding points on the first image and the second image coincide with each other on the basis of the obtained planar projective transform matrix.

6. The image synthesizer according to claim 5, wherein the first means extracts the overlapped portion of the first image and the second image on the basis of the Sum of Squared Differences method.

7. The image synthesizer according to claim 5, wherein the third means comprises
means for finding the optical flow from the first image and the second image on the basis of an optical flow estimation method using the hierarchically structured Lucas-Kanade method for filling the optical flow having low confidence out of the optical flows obtained in the respective stages of the optical flow estimation method by dilation processing using the optical flow in its surrounding regions, and
means for tracking the position, on the second image, of each of the feature points on the first image on the basis of the obtained optical flow.

8. A computer readable recording medium on which an image synthesis program for synthesizing a first image and a second image without a seam is recorded, wherein
the image synthesis program comprises
the first step of extracting an overlapped portion of the first image and the second image,
the second step of extracting from the overlapped portion of the first image a plurality of partial images which are effective for tracking by optical flow as feature points,
the third step of tracking a position, on the second image, of each of the feature points on the first image on the basis of the optical flow,
the fourth step of finding a planar projective transform matrix for finding, on the basis of each of the feature points on the first image and the corresponding position on the second image which is found in the third step, a point, corresponding to the point on the first image, on the second image, and
the fifth step of synthesizing the first image and the second image such that the corresponding points on the first image and the second image coincide with each other on the basis of the obtained planar projective transform matrix.

9. The computer readable recording medium according to claim 8, wherein
in the first step, the overlapped portion of the first image and the second image is extracted on the basis of the Sum of Squared Differences method.

10. The computer readable recording medium according to claim 8, wherein
the third step comprises the steps of
finding the optical flow from the first image and the second image on the basis of an optical flow estimation method using the hierarchically structured Lucas-Kanade method for filling the optical flow having low confidence out of the optical flows obtained in the respective stages of the optical flow estimation method by dilation processing using the optical flow in its surrounding regions, and
tracking the position, on the second image, of each of the feature points on the first image on the basis of the obtained optical flow.

11. A digital camera in which an image synthesis program for synthesizing a first image and a second image without a seam is incorporated, wherein
the image synthesis program comprises
the first step of extracting an overlapped portion of the first image and the second image;
the second step of extracting from the overlapped portion of the first image a plurality of partial images which are effective for tracking by optical flow as feature points;
the third step of tracking the position, on the second image, of each of the feature points on the first image on the basis of the optical flow;
the fourth step of finding a planar projective transform matrix for finding, on the basis of each of the feature points on the first image and the corresponding position on the second image which is found in the third step, a point, corresponding to the point on the first image, on the second image; and
the fifth step of synthesizing the first image and the second image such that the corresponding points on the first image and the second image coincide with each other on the basis of the obtained planar projective transform matrix.

12. A printer in which an image synthesis program for synthesizing a first image and a second image without a seam is incorporated, wherein
the image synthesis program comprises
the first step of extracting an overlapped portion of the first image and the second image;
the second step of extracting from the overlapped portion of the first image a plurality of partial images which are effective for tracking by optical flow as feature points;
the third step of tracking a position, on the second image, of each of the feature points on the first image on the basis of the optical flow;
the fourth step of finding a planar projective transform matrix for finding, on the basis of each of the feature points on the first image and a corresponding position on the second image which is found in the third step, a point, corresponding to the point on the first image, on the second image; and
the fifth step of synthesizing the first image and the second image such that the corresponding points on the first image and the second image coincide with each other on the basis of the obtained planar projective transform matrix.

* * * * *